(12) United States Patent
Yoshino et al.

(10) Patent No.: US 12,397,475 B2
(45) Date of Patent: Aug. 26, 2025

(54) METHOD FOR PRODUCING FLAME RETARDANT POLYCARBONATE RESIN COMPOSITION PELLET

(71) Applicant: Mitsubishi Engineering-Plastics Corporation, Minato-ku (JP)

(72) Inventors: Takafumi Yoshino, Hiratsuka (JP); Toshiyuki Tajiri, Hiratsuka (JP); Hiroyuki Tajima, Hiratsuka (JP)

(73) Assignee: Mitsubishi Engineering-Plastics Corporation, Minato-ku (JP)

( * ) Notice: Subject to any disclaimer, the term of this patent is extended or adjusted under 35 U.S.C. 154(b) by 128 days.

(21) Appl. No.: 17/997,341

(22) PCT Filed: Mar. 8, 2021

(86) PCT No.: PCT/JP2021/008902
§ 371 (c)(1),
(2) Date: Oct. 27, 2022

(87) PCT Pub. No.: WO2022/004058
PCT Pub. Date: Jan. 6, 2022

(65) Prior Publication Data
US 2023/0150171 A1    May 18, 2023

(30) Foreign Application Priority Data
Jun. 30, 2020   (JP) ................. 2020-112603

(51) Int. Cl.
*B29C 48/405*   (2019.01)
*B29B 9/06*     (2006.01)
(Continued)

(52) U.S. Cl.
CPC ............ *B29B 9/065* (2013.01); *B29C 48/022* (2019.02); *B29C 48/405* (2019.02); *C08G 64/00* (2013.01);
(Continued)

(58) Field of Classification Search
CPC ....... B29C 48/022; B29C 48/405; B29B 9/12; B29K 2069/00
See application file for complete search history.

(56) References Cited

U.S. PATENT DOCUMENTS

2014/0200302 A1*   7/2014   Kulkarni ............. B29C 45/0001
524/451

FOREIGN PATENT DOCUMENTS

| CN | 201677485 U | 12/2010 |
| JP | 2000-198116 A | 7/2000 |

(Continued)

OTHER PUBLICATIONS

JP2019181825 machine translation (Year: 2019).*
International Search Report Issued Apr. 27, 2021, in PCT/JP2021/008902, filed on Mar. 8, 2021, 2 pages.

*Primary Examiner* — Alison L Hindenlang
*Assistant Examiner* — Alexander A Wang
(74) *Attorney, Agent, or Firm* — Oblon, McClelland, Maier & Neustadt, L.L.P.

(57) ABSTRACT

A method for producing a polycarbonate resin composition pellet with a twin screw extruder, the polycarbonate resin composition pellet has 30 to 95 mass % of a resin pellet (A) containing more than 40 mass % of a polycarbonate resin in the pellet; not less than 5 mass % and less than 40 mass % of a phosphate ester flame retardant (B) that is a liquid at room temperature; 0 to 50 mass % of polycarbonate resin flake (C); 0 to 30 mass % of an ABS resin (D); and 0 to 15 mass % of an additive (E) other than component (B). The method includes feeding components (A), (C), (D) and (E) in a twin screw extruder and kneading with a first kneading zone; feeding component (B) to a downstream part in the first kneading zone and kneading with a second kneading zone; and decompressing a vent in the downstream part in the second kneading zone.

7 Claims, 2 Drawing Sheets

(51) Int. Cl.
B29C 48/00 (2019.01)
C08G 64/00 (2006.01)
C08K 5/521 (2006.01)
C08L 55/02 (2006.01)
*B29K 55/02* (2006.01)
*B29K 69/00* (2006.01)
*B29K 105/00* (2006.01)
*B29K 105/26* (2006.01)

(52) U.S. Cl.
CPC .............. C08K 5/521 (2013.01); C08L 55/02 (2013.01); *B29K 2055/02* (2013.01); *B29K 2069/00* (2013.01); *B29K 2105/0026* (2013.01); *B29K 2105/0088* (2013.01); *B29K 2105/251* (2013.01); *B29K 2105/26* (2013.01)

(56) References Cited

FOREIGN PATENT DOCUMENTS

| JP | 2016-107611 A | 6/2016 |
| JP | 2019-181825 A | 10/2019 |
| JP | 2019-210397 A | 12/2019 |

\* cited by examiner

METHOD FOR PRODUCING FLAME RETARDANT POLYCARBONATE RESIN COMPOSITION PELLET

CROSS REFERENCE TO RELATED APPLICATIONS

This application is a National Stage entry under 35 U.S.C. § 371 of PCT/JP2021/008902, filed on Mar. 8, 2021, and claims priority to Japanese Patent Application No. 2020-112603, filed on Jun. 30, 2020, the entire contents of which are incorporated herein by reference.

TECHNICAL FIELD

The present invention relates to a method for producing a flame retardant polycarbonate resin composition pellet.

BACKGROUND ART

Polycarbonate resins exhibit excellent heat resistance and mechanical properties, and are therefore widely used in, for example, materials for producing components of electrical equipment, electronic devices, vehicles such as automobiles, office automation equipment such as printers and copiers, houses, buildings and other industrial fields.

These products require flame retardancy from a safety perspective in order to prevent fire caused by high temperatures, and flame retardant polycarbonate resin compositions in particular are advantageously used in office automation equipment such as printers and copiers, personal computers, a variety of handheld terminals, housings for batteries, and the like.

In recent years, however, environmental awareness has increased and there have been increased social demands for reuse of resins, and restrictions have been strengthened by a variety of legal systems. In addition, there are requirements for use of recycled resins in particular in, for example, exterior materials and housings of office automation equipment and electronic equipment, and there are now many cases where polycarbonate resin compositions containing a prescribed amount of recycled resin are required.

In order to regenerate thermoplastic plastics from used products, thermoplastic plastic members are recovered from components of equipment and washed with a washing liquid, and pulverized thermoplastic plastic is separated from the pulverized mixture, as disclosed in PTL 1 for example.

Examples of raw materials for recycled polycarbonate resins include optical discs, such as CDs and DVDs, light guide plates, transparent motor vehicle components, such as vehicle windows, headlamp lenses and windscreens, containers such as water bottles, eyeglass lenses, and construction materials, such as noise barriers, windows and corrugated sheets, and these are reused as pellets obtained by pulverizing, washing, separating and recovering. In addition, by-products, such as sprues and runners formed during molding, can also be repelleted and used.

Such recycled products require high flame retardancy in order to be used in office automation equipment in particular.

Methods comprising blending halogen-containing flame retardants, such as organic bromine compound, were well known in the past as methods for imparting polycarbonate resin with flame retardancy, but there have been proposals in recent years to blend halogen-containing flame retardants and phosphorus-containing flame retardants in polycarbonate resins, and phosphorus-containing flame retardants are most commonly used at present.

CITATION LIST

Patent Literature

[PTL 1] JP 2000-198116 A

SUMMARY OF INVENTION

Technical Problem

Phosphorus-containing flame retardants, such as phosphate ester-containing flame retardants, include those that are solid at room temperature and those that are liquid at room temperature, and liquid flame retardants require addition of a liquid to an extruder. However, in a case where a phosphorus-containing liquid flame retardant and a pellet-like polycarbonate resin such as a recycled material mentioned above are melt kneaded using an extruder, the phosphorus-containing liquid flame retardant is hardly blended, unmelted polycarbonate resin can be present, resin can leak from a vent opening, the discharged amount may not increase, strand take-up may not be possible, the flame retardancy of an obtained polycarbonate resin composition pellet may be insufficient, and color hue may deteriorate.

The purpose of (problem to be addressed by) the present invention resides in a method for producing a polycarbonate resin composition, in which the problem mentioned above can be solved by obtaining a flame retardant polycarbonate resin composition using a phosphorus-containing liquid flame retardant.

Solution to Problem

As a result of diligent research carried out in order to solve the problem mentioned above, the inventors of the present invention found that in a case where a resin pellet containing a polycarbonate resin is produced in a twin screw extruder through addition of a phosphate ester flame retardant that is a liquid at room temperature, by feeding the liquid phosphate ester to a downstream part of a first kneading zone, then kneading in a subsequent kneading zone, and imparting each kneading zone with a specific screw configuration, it is possible to produce a polycarbonate resin composition pellet which does not cause unmelted product to be present, does not cause resin to leak from a vent, achieves good productivity stably at a high discharge rate, and exhibits excellent uniform flame retardancy and color hue, and thereby completed the present invention.

The present invention relates to the following method for producing a polycarbonate resin composition pellet 1. A method for producing a polycarbonate resin composition pellet with a twin-screw extruder, the polycarbonate resin composition pellet comprising: 30 to 95 mass % of a resin pellet (A) containing more than 40 mass % of a polycarbonate resin in the pellet; not less than 5 mass % and less than 40 mass % of a phosphate ester flame retardant (B) that is a liquid at room temperature; 0 to 50 mass % of polycarbonate resin flake (C); 0 to 30 mass % of an ABS resin (D); and 0 to 15 mass % of an additive (E) other than component (B) [here, the total amount of components (A) to (E) is 100 mass %], the method being characterized by including:

a first step for feeding components (A), (C), (D) and (E) in a twin screw extruder and kneading with a first kneading zone, a second step for feeding component (B) to a downstream part in the first kneading zone and kneading with a second kneading zone, and a third step for decompressing a vent in the downstream part in the second kneading zone to devolatilize and extrude, wherein the first kneading zone has a configuration in which the length thereof is 2.5 D to 6.0 D (D is the screw diameter) and consists of a combination of two or more of an R kneading disc, an N kneading disc, an L kneading disc, an L screw, a sealing ring, a mixing screw and a rotor screw, and the second kneading zone has a configuration in which the length thereof is 1.3 D to 4.0 D and consists of a combination of two or more of an R kneading disc, an N kneading disc, an L kneading disc, an L screw, a sealing ring, a mixing screw and a rotor screw.

2. The production method of 1 above, wherein the amount of a polycarbonate resin pellet in the resin pellet (A) is more than 50 mass %.

3. The production method of 1 or 2 above, wherein the amount of the resin pellet (A) is 30 to 80 mass % relative to a total of 100 mass % of components (A) to (E).

4. The production method of any one of 1 to 3 above, wherein the amount of the phosphate ester flame retardant (B) that is a liquid at room temperature is not less than 5 mass % and less than 25 mass % relative to a total of 100 mass % of components (A) to (E).

5. The method for producing a polycarbonate resin composition pellet of any one of 1 to 4 above, wherein the resin pellet (A) includes a recycled resin pellet.

6. The method for producing a polycarbonate resin composition pellet of any one of 1 to 5 above, wherein the pellet contains 50 to 100 mass % of a polycarbonate resin and 50 to 0 mass % of an ABS resin and/or a polyester resin (each relative to a total of 100 mass % of both components) as resin components.

7. The method for producing a polycarbonate resin composition pellet of any one of 1 to 6 above, wherein the length of the first kneading zone is 3.5 D to 5.5 D and the length of the second kneading zone is 2.0 D to 4.0 D.

Advantageous Effects of Invention

According to the production method of the present invention, it is possible to produce a polycarbonate resin composition pellet which does not cause unmelted product to be present, does not cause resin to leak from a vent, achieves good productivity stably at a high discharge rate, and exhibits excellent uniform flame retardancy and color hue.

DESCRIPTION OF EMBODIMENTS

The present invention will now be explained in detail through the use of embodiments and examples, but it should be understood that the present invention is not limited to these embodiments and examples.

Raw materials used in the method for producing a polycarbonate resin composition pellet of the present invention comprise 30 to 95 mass % of a resin pellet (A) containing more than 40 mass % of a polycarbonate resin in the pellet; not less than 5 mass % and less than 40 mass % of a phosphate ester flame retardant (B) that is a liquid at room temperature; 0 to 50 mass % of polycarbonate resin flake (C); 0 to 30 mass % of an ABS resin (D); and 0 to 15 mass % of an additive (E) other than component (B), each relative to a total amount of 100 mass % of components (A) to (E). Here, the total amount of components (A) to (E) is 100 mass %.

[Resin Pellet (A)]

A resin pellet (A) containing more than 40 mass % of a polycarbonate resin in the pellet is used in the method for producing a polycarbonate resin composition pellet of the present invention. The resin pellet (A) should contain more than 40 mass % of a polycarbonate resin, and the resin pellet is preferably a mixture or alloy that also contains another resin other than a polycarbonate resin, such as an ABS resin or a thermoplastic polyester (a polybutylene terephthalate resin or a polyethylene terephthalate resin). The content of the polycarbonate resin pellet in the resin pellet (A) is preferably more than 50 mass %.

The resin pellet (A) may be an unused so-called virgin pellet, but may also be a recycled material pellet or include a recycled material pellet. Preferred examples of raw materials of recycled material pellet include optical disc, such as CD and DVD, light guide plate, transparent motor vehicle component, such as vehicle window, headlamp lense and windscreen, container such as water bottle, eyeglass lense, and construction material, such as noise barrier, window and corrugated sheet. It is also possible to use pulverized product obtained from defective product, sprue and runner formed during molding, and repelleted product obtained by pulverizing, washing, separating and recovering these. Hereinafter, these recycled material and repelleted product are also referred to as recycled material and recycled pellet.

Use of pellet of recycled material is particularly preferred in the method for producing a polycarbonate resin composition pellet of the present invention. Use of pellet of recycled material is preferred from the perspective of lowering LCA (life cycle assessment).

Recycled material often contains resin other than polycarbonate resin and a variety of additive, but a pellet containing more than 40 mass % of the polycarbonate resin can be used as the resin pellet (A). Pellet of polycarbonate resin recycled material can be purchased from recycled material manufacturers.

[Polycarbonate Resin]

Examples of the polycarbonate resin include aromatic polycarbonate resin, aliphatic polycarbonate resin and aromatic-aliphatic polycarbonate resin, but aromatic polycarbonate resin are preferred, and more specifically, it is possible to use an aromatic polycarbonate polymer or copolymer obtained by reacting an aromatic dihydroxy compound with phosgene or a carbonic acid diester.

Examples of the aromatic dihydroxy compound include 2,2-bis(4-hydroxyphenyl)propane (that is, bisphenol A), 2,2-bis(3-methyl-4-hydroxyphenyl)propane (that is, bisphenol C), tetramethylbisphenol A, α,α'-bis(4-hydroxyphenyl)-p-diisopropylbenzene, hydroquinone, resorcinol and 4,4'-dihydroxydiphenyl.

Preferred examples of polycarbonate resin include polycarbonate resin obtained using bisphenol A or a combination of bisphenol A and another aromatic dihydroxy compound as dihydroxy compound and polycarbonate resin obtained using bisphenol C or a combination of bisphenol C and another aromatic dihydroxy compound (especially bisphenol A).

The polycarbonate resin may be a homopolymer comprising one type of repeating unit or a copolymer having two or more types of repeating unit. Here, copolymer may be selected from among a variety of copolymer form, such as random copolymer and block copolymer.

The method for producing the aromatic polycarbonate resin is not particularly limited, and it is possible to use a conventional method such as the phosgene method (an interfacial polymerization method) or a melt process (a transesterification method).

The molecular weight of the polycarbonate resin is not limited, but the viscosity average molecular weight (Mv) thereof is generally approximately 10,000 to 100,000, and preferably approximately 12,000 to 35,000. By setting the viscosity average molecular weight to be no lower than the lower limit of the range mentioned above, it is possible to further improve the mechanical strength of the polycarbonate resin composition, and this viscosity average molecular weight is more preferred in cases where the thermoplastic resin composition is to be used in applications requiring high mechanical strength. Meanwhile, by setting the viscosity average molecular weight to be no higher than the upper limit of the range mentioned above, it is possible to better suppress a reduction in the fluidity of the polycarbonate resin composition, increase molding processing properties, and facilitate thin wall molding properties.

Moreover, it is possible to use a mixture of two or more types of polycarbonate resin having different viscosity average molecular weights, and in such cases, it is possible to mix polycarbonate resins whose viscosity average molecular weights fall outside the preferred range mentioned above.

In the present invention, the viscosity average molecular weight (Mv) of the polycarbonate resin is a value that is obtained by determining the intrinsic viscosity ([η]) by measuring the viscosity of a methylene chloride solution of the polycarbonate resin at 25° C. using a Ubbelohde type viscometer, and then calculating the viscosity average molecular weight from the Schnell viscosity equation below.

$$[\eta]=1.23\times10^{-4}M_v^{0.83}$$

The method for producing the polycarbonate resin is not particularly limited, and it is possible to use a polycarbonate resin produced using the phosgene method (an interfacial polymerization method) or a melt process (a transesterification method). In addition, a polycarbonate resin obtained by subjecting a polycarbonate resin produced by means of a melt process to a post treatment for adjusting the amount of terminal hydroxyl groups is also preferred.

Preferred examples of used products include optical disc, such as CD and DVD, light guide plate, transparent motor vehicle component, such as vehicle window, headlamp lense and windscreen, container such as water bottle, eyeglass lense, and construction material, such as noise barrier, window and corrugated sheet. In addition, recycled polycarbonate resin can be pulverized product obtained from defective article, sprues and runner at the time of molding, or pellet obtained by melting these pulverized product.

[Phosphate Ester Flame Retardant (B)]

The phosphate ester flame retardant used in the present invention is a phosphate ester flame retardant that is a liquid at room temperature.

Here, being "a liquid at room temperature" means being a liquid at 23° C.

Examples of phosphate ester flame retardant include phosphate compound and condensed phosphate ester, with condensed phosphate ester being preferred.

A phosphate ester compound represented by general formula (1) below, which is a liquid at room temperature, is particularly preferred as a condensed phosphate ester.

(In the formula, $R^1$, $R^2$, $R^3$ and $R^4$ each denote an alkyl group having 1 to 6 carbon atoms or an aryl group which has 6 to 20 carbon atoms and which may be substituted with an alkyl group, p, q, r and s are each 0 or 1, k is an integer between 1 and 5, and $X^1$ is an arylene group.)

The phosphate ester compound represented by general formula (1) may be a mixture of compounds for which the value of k differs from compound to compound, and in the case of a mixture of phosphate esters for which the value of k differs from compound to compound, the value of k is taken to be the average value of k of the compounds in the mixture. In the case of a mixture of compounds for which the value of k differs from compound to compound, the average value of k is preferably 1 to 2, more preferably 1 to 1.5, further preferably 1 to 1.2, and particularly preferably 1 to 1.15.

In addition, $X^1$ denotes a divalent arylene group, and is a divalent group derived from, for example, a dihydroxy compound such as resorcinol, hydroquinone, bisphenol A, 2,2'-dihydroxybiphenyl, 2,3'-dihydroxybiphenyl, 2,4'-dihydroxybiphenyl, 3,3'-dihydroxybiphenyl, 3,4'-dihydroxybiphenyl, 4,4'-dihydroxybiphenyl, 1,2-dihydroxynaphthalene, 1,3-dihydroxynaphthalene, 1,4-dihydroxynaphthalene, 1,5-dihydroxynaphthalene, 1,6-dihydroxynaphthalene, 1,7-dihydroxynaphthalene, 1,8-dihydroxynaphthalene, 2,3-dihydroxynaphthalene, 2,6-dihydroxynaphthalene or 2,7-dihydroxynaphthalene. Of these, a divalent group derived from bisphenol A or 3,3'-dihydroxybiphenyl is particularly preferred.

In addition, the values of p, q, r and s in general formula (1) are 0 or 1, with 1 being preferred.

In addition, $R^1$, $R^2$, $R^3$ and $R^4$ each denote an alkyl group having 1 to 6 carbon atoms or an aryl group which has 6 to 20 carbon atoms and which may be substituted with an alkyl group. Examples of such aryl groups include phenyl group, cresyl group, xylyl group, isopropylphenyl group, butylphenyl group, tert-butylphenyl group, di-tert-butylphenyl group and p-cumylphenyl group, but phenyl group, cresyl group and xylyl group are more preferred.

Among condensed phosphate ester represented by general formula (1), bisphenol A bis-diphenyl phosphate or the like is preferred as a specific example that is a liquid at room temperature. Examples of commercially available products include FP-600 produced by ADEKA and CR-741 produced by Daihachi Chemical Industry Co., Ltd.

[Method for Producing Polycarbonate Resin Composition Pellet]

The production method of the present invention includes a first step for feeding the resin pellet (A) and other components in a twin screw extruder and kneading with a first kneading zone, a second step for feeding component (B) to a downstream part in the first kneading zone and kneading with a second kneading zone, and a third step for decompressing a vent in the downstream part in the second kneading zone to devolatilize and extrude.

A twin screw extruder is used in the production method of the present invention. A variety of twin screw extruders can be used, and the screw rotation type can be co-rotating or counter-rotating, but a same direction meshing type twin screw extruder is preferred. In addition, a vent opening which can be decompressed or opened to the atmosphere is provided in the twin screw extruder.

Figure 1:
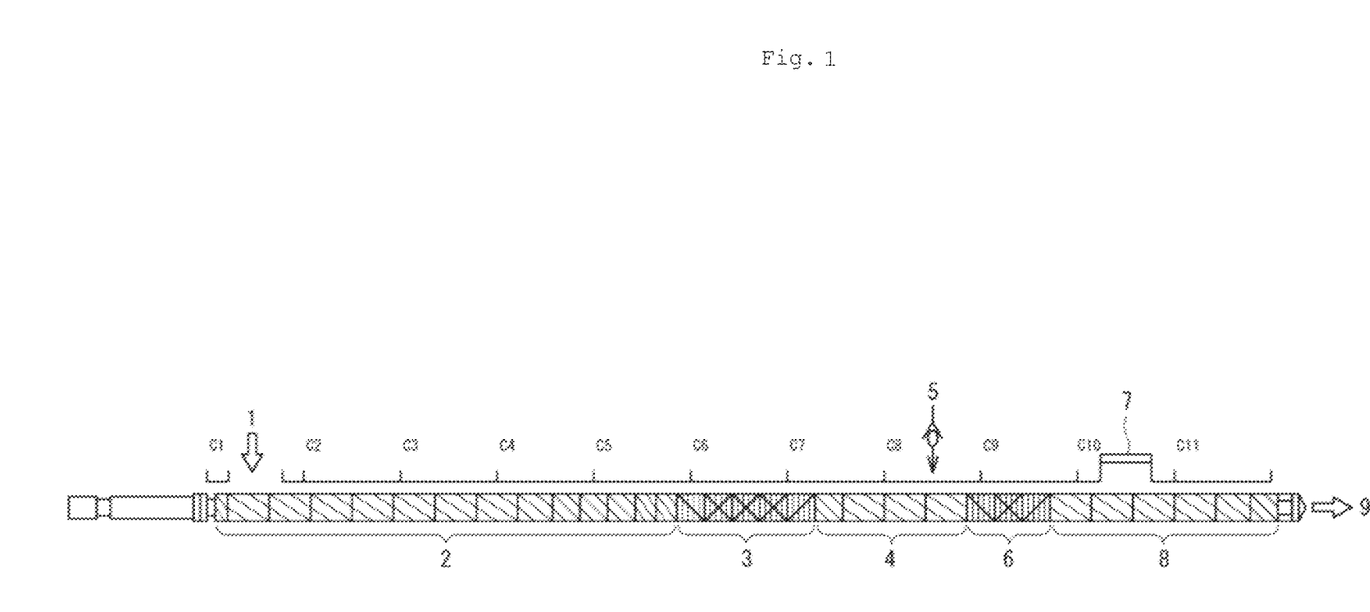
FIG. 1 is a horizontal cross-sectional view showing an example of a screw configuration of an extruder used in the method of the present invention.
Figure 2:
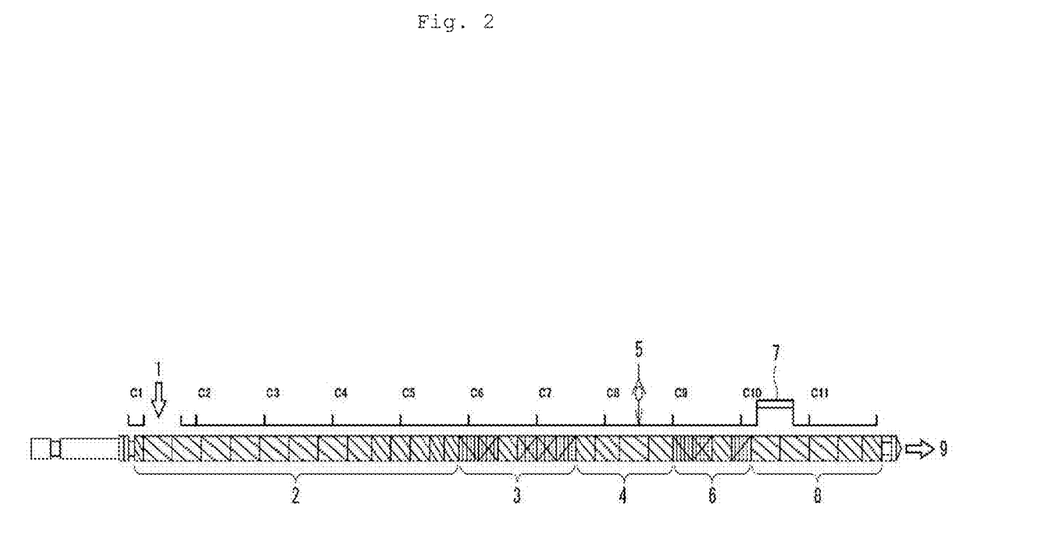
FIG. 2 is a horizontal cross-sectional view showing another example of a screw configuration of an extruder used in the method of the present invention.

FIG. 1 is a horizontal cross-sectional view showing an example of a screw configuration of an extruder used in the method of the present invention. The production method of the present invention will now be explained with reference to FIGS. 1 to 2.

The raw material resin pellet (A) and other components (C) to (E) are fed to a twin screw extruder from a feeding port 1 located at the base of the extruder, the resin pellet (A) is transported towards a discharge port 9, which is shown on the right hand side of FIG. 1, while being melt kneaded as a result of the extruder barrel being heated and a screw being rotated, and a strand that is discharged from the discharge port 9 is pelletized by a granulator.

The resin pellet (A) or the like fed from the feeding port 1 is fed, transported and pre-heated in a feeding·transporting·preheating zone 2. The transporting screw is preferably constituted from ordinary flight-shaped screw elements.

The resin pellet (A) is then melted in a first kneading zone 3, but the first kneading zone 3 has a configuration in which the length thereof is 2.5 D to 6.0 D (D denotes the diameter of the screw) and consists of a combination of two or more of an R kneading disc, an N kneading disc, an L kneading disc, an L screw, a sealing ring, a mixing screw and a rotor screw.

Moreover, the first kneading zone means a region in which kneading is carried out before the phosphate ester liquid flame retardant is fed, and the first kneading zone may be configured so that two or more of an R kneading disc, an N kneading disc, an L kneading disc, an L screw, a sealing ring, a mixing screw and a rotor screw are continuous or separated into multiple sections. The total length of two or more of an R kneading disc, an N kneading disc, an L kneading disc, an L screw, a sealing ring, a mixing screw and a rotor screw should be 2.5 D to 6.0 D (D denotes the diameter of the screw), and an ordinary transporting flight that does not have a kneading action is not included in the length of the first kneading zone. For example, an ordinary transporting flight-shaped element (a diagonally hatched element shown in 3 in FIG. 2) may be placed between a plurality of kneading discs, as in the case of the first kneading zone 3 shown in FIG. 2, and this transporting flight-shaped element is not included in the length of 2.5 D to 6.0 D.

An R kneading disc is also referred to as a forward kneading disc (hereinafter also referred to as R), and generally has 2 or more vanes, with the angle of twist θ between the vanes being 10° to 75°. By disposing the vanes so as to be offset at a prescribed angle in this way, the resin can be transported and a strong shearing force can be applied.

An N kneading disc is also referred to as an orthogonal kneading disc (hereinafter also referred to as N), and generally has 2 or more vanes, with the angle of twist θ between the vanes being 75° to 105°. Because the vanes are disposed so as to be offset by approximately 90°, there is almost no force for transporting the resin, but the kneading force is strong.

An L kneading disc is also referred to as a backward kneading disc (hereinafter also referred to as L), and generally has 2 or more vanes, with the angle of twist θ between the vanes being −10° to −75°. An L kneading disc is an element having a pressure-increasing function that holds up the transported resin and acts on the transported resin in the opposite direction. By providing an element for facilitating kneading on the downstream side, the resin is held up and a strong kneading effect is achieved.

An L screw is also referred to as a backward screw, and generally rotates in the opposite direction from a transporting screw, and is an element having a pressure-increasing function that holds up the transported resin and acts on the transported resin in the opposite direction. By providing an element for facilitating kneading on the downstream side, in the same way as the L kneading disc, the resin is held up and a strong kneading effect is achieved.

The vanes mentioned above are generally elliptical, and flattened parts are formed at two elliptical apexes. These vanes are also referred to as discs, and the kneading discs are generally constituted from 3 to 7 discs. These discs may, in some cases, have 3 substantially triangular apexes, and such discs are also referred to as three-pointed kneading discs. The same is true for R, N and L types. These can be used in the same way. There are also twisted kneading discs in which apexes in kneading discs are twisted in the screw axis direction, and these can achieve a similar kneading effect.

A sealing ring is a ring-shaped element fitted to a screw, blocks approximately 70 to 90% of a flow path, and hinders the flow of the resin, thereby enabling the resin pressure to increase. By providing an element for facilitating kneading on the downstream side, in the same way as the L kneading disc, the resin is held up and a strong kneading effect can be achieved.

A mixing screw is formed by removing a part of a peak of a screw flight, is a one-pointed or two-pointed screw for forward or reverse transporting, and is an element having a strong shearing and dispersing force. Types of mixing screw include a forward transporting notch type mixing screw and a reverse transporting notch type mixing screw.

A rotor screw is a screw obtained by forming a rotor blade having an elliptical shape (a two-blade structure) or a triangular shape, and a strong shearing force can be applied by a gap between the rotor and the inner wall surface of the barrel (the tip clearance).

The first kneading zone 3 is formed by combining two or more of the components mentioned above, but is preferably a combination of an R kneading disc, an N kneading disc and an L kneading disc, for example a configuration in which a plurality of N are provided after an R and an L is then provided, with RNNL, RNNNL, and the like, being particularly preferred.

In addition, the length of the disc configuration in the first kneading zone 3 is 2.5 D to 6.0 D, but is preferably 3.5 D to 5.5 D.

By using a first kneading zone constituted in the manner described above, the resin pellet (A) can be sufficiently melted and transported to the second kneading zone 6 by a transporting zone 4, but in this case, a phosphate ester liquid flame retardant (B) is fed using a liquid feeding device 5 (a liquid supply pump or the like) provided downstream of the first kneading zone.

The quantity of the phosphate ester liquid flame retardant (B) is not less than 5 mass % and less than 40 mass % relative to 100 mass % of the obtained polycarbonate resin composition pellet, and by specifying such an quantity, it is possible to achieve both high flame retardancy and high heat resistance. If this quantity is 40 mass % or more, heat resistance deteriorates. This quantity is preferably 7 mass % or more and more preferably 10 mass % or more, and is preferably less than 35 mass %, more preferably less than 30 mass %, such as less than 25 mass % or 23 mass % or less, and is particularly preferably 21 mass % or less.

The molten resin pellet (A) or the like and the phosphate ester liquid flame retardant (B) are melt kneaded in the second kneading zone 6.

The second kneading zone 6 has a configuration in which the length thereof is 1.3 D to 4.0 D and consists of a combination of two or more of an R kneading disc, an N kneading disc, an L kneading disc, an L screw, a sealing ring, a mixing screw and a rotor screw. By setting the screw configuration of the second kneading zone 6 to be as described above and combining with the screw configuration of the first kneading zone 3, the resin pellet (A) and the phosphate ester liquid flame retardant (B) can be uniformly melt kneaded, good productivity can be stably achieved, and it is possible to produce a polycarbonate resin composition pellet that exhibits excellent uniform flame retardancy and color hue.

Moreover, the second kneading zone means a region in which kneading is carried out up to the point where the phosphate ester flame retardant is introduced and reaches the vacuum vent, and the second kneading zone may be configured so that two or more of an R kneading disc, an N kneading disc, an L kneading disc, an L screw, a sealing ring, a mixing screw and a rotor screw are continuous or separated into multiple sections. The total length of two or more of an R kneading disc, an N kneading disc, an L kneading disc, an L screw, a sealing ring, a mixing screw and a rotor screw should be 1.3 D to 4.0 D (D denotes the diameter of the screw), and an ordinary transporting flight that does not have a kneading action is not included in the length of the second kneading zone. For example, an ordinary transporting flight-shaped element (a diagonally hatched element shown in 6 in FIG. 2) may be placed and distributed between a plurality of kneading discs, as in the case of the second kneading zone 6 shown in FIG. 2, and this transporting flight-shaped element is not included in the length of 1.3 D to 4.0 D.

The second kneading zone 6 is formed by combining two or more of the components mentioned above, but is preferably a combination of an R kneading disc, an N kneading disc and an L kneading disc, for example a configuration in which a plurality of N are provided after an R and an L is then provided, with RNL, RNNL, RNNNL, RNNNNL, RNNNNNL, and the like, being particularly preferred. In these configurations, it is possible to use a combination of 0.5 D or 1.0 D for the R, N and L.

In addition, the length of the disc configuration in the second kneading zone 6 is 1.3 D to 4.0 D, but is preferably 2.0 D to 4.0 D.

After the second kneading zone 6, devolatilization is carried out by decompressing a vent 7 located downstream of the second kneading zone, and the polycarbonate resin composition is extruded as a strand from an extruding die located in a discharge zone 9 at the tip of an extruder 8.

The screw rotational speed in the twin screw extruder is preferably approximately 500 to 900 rpm.

In the method of the present invention, the discharge rate is preferably 350 kg/hr or more, more preferably 380 kg/hr or more, further preferably 400 kg/hr or more, such as 450 kg/hr or more, and it is particularly preferable to be able to achieve a discharge rate of 500 kg/hr or more.

Next, the extruded strand-like molten polycarbonate resin composition is cooled in water and cut to form pellets.

The shape of the extruding die is not particularly limited, and a well-known type of die is used. The diameter of the die of the discharge nozzle depends on the extrusion pressure and the desired pellet dimensions, but is generally approximately 2 to 5 mm. The temperature of the polycarbonate resin immediately following extrusion is preferably 280 to 300° C., and more preferably approximately 280 to 290° C.

In the method of the present invention, it is preferable to blend polycarbonate resin flake (C), an ABS resin (D) and an additive (E) other than component (B) in addition to the resin pellet (A) and the phosphate ester liquid flame retardant (B). The blending quantities of these components are, relative to a total of 100 mass % of components (A) to (E), 0 to 50 mass % of the polycarbonate resin flake (C), 0 to 30 mass % of the ABS resin (D) and 0 to 15 mass % of the additive (E) other than component (B).

Excluding a case where side feeding is particularly preferred, these components (C) to (E) are fed from the feeding port 1 located at the base of the twin screw extruder together with, or separately from, the resin pellet (A).

The average particle diameter of the polycarbonate resin flake (C) is preferably 2 mm or less, and more preferably 1.5 mm or less. By supplying the flaky polycarbonate resin, it is possible to suppress occurrence of unmelted product and aggregation and so on of additives, and uniform polycarbonate resin composition pellets can be readily obtained.

In a case where the polycarbonate resin flake (C) are used, the blending quantity thereof is preferably 5 to 45 mass %.

The ABS resin (D) preferably comprises an aromatic vinyl monomer component, a vinyl cyanide monomer component and a diene-based rubbery polymer component, and is preferably an acrylonitrile-butadiene-styrene copolymer. The ABS resin (D) is preferably supplied in the form of pellets from the feeding port 1 located at the base of the twin screw extruder, together with the resin pellet (A). In a case where the ABS resin (D) is used, the blending quantity thereof is preferably 5 to 25 mass %.

Preferred examples of the additive (E) other than the phosphate ester liquid flame retardant (B) include auxiliary flame retardants such as a fluororesin (PTFE), a variety of elastomers (impact resistance-improving agents), mold-release agent, stabilizer, filler, reinforcing agent, other resin components, other flame retardant, coloring agent (dye and pigment), ultraviolet radiation absorber, anti-static agent, anti-fogging agent, anti-blocking agent, fluidity-improving agent, plasticizer, dispersing agent and antimicrobial agent. In a case where an additive (E) other than component (B) is used, the blending quantity thereof is 15 mass % or less, preferably 13 mass % or less, and further preferably 12 mass % or less, such as 11 mass % or less or even 10 mass % or less.

A polycarbonate resin composition pellet obtained using the production method of the present invention comprises: 30 to 95 mass %, and preferably 30 to 80 mass %, of a resin derived from the resin pellet (A); not less than 5 mass % and less than 40 mass %, and preferably not less than 5 mass % and less than 25 mass %, of the phosphate ester flame retardant (B); 0 to 50 mass % of a polycarbonate resin derived from the polycarbonate resin flake (C); 0 to 30 mass % of the ABS resin (D); and 0 to 15 mass % of the additive (E) other than component (B) [here, the total amount of components (A) to (E) is 100 mass %].

A method for producing a molded article from the obtained polycarbonate resin composition pellet is not particularly limited, and it is possible to use a molding method routinely used for polycarbonate resin, that is, an ordinary injection molding method, an ultrahigh speed injection molding method, an injection compression molding method, a multi-color molding method, a gas assisted injection molding method, a molding method involving the use of a heat insulating mold, a molding method involving the use of a rapidly heated and cooled mold, a foaming molding method (including supercritical fluids), an insert molding method, an IMC (in-mold coating) molding method, an extrusion molding method, a sheet molding method, a thermoforming method, a rotational molding method, a lamination molding method or a press molding method.

An obtained molded article can be advantageously used as a component of office automation equipment, such as a printer or copier, electrical equipment, an electronic device, a vehicle such as an automobile, office automation equipment, such as a printer or copier, a house, a building, and the like, and can be used particularly advantageously as a housing for office automation equipment, such as a printer or copier, a computer, a personal computer, a variety of hand-held terminals, a battery, and the like.

Working Examples

The present invention will now be explained in greater detail through the use of working examples. However, it should be understood that the present invention is not limited to the working examples given below.

The screw configuration of the extruder used in the working examples and comparative examples is as follows.

Examples of Configuration of First Kneading Zone

In configuration examples 1 to 4, the number of kneading discs is five and the disc length is 1 D.
  Configuration example 1: RL; length 2 D
  Configuration example 2: RNNL; length 4 D
  Configuration example 3: RNNNL; length 5 D
  Configuration example 4: RNNNNNL; length 7 D Examples of Configuration of Second Kneading Zone In configuration examples 1, 2 and 4, the number of kneading discs is five and the disc length is 1 D, and in configuration example 3, the number of kneading discs is five and the disc length is 0.5 D.
  Configuration example 1: L; length 1 D
  Configuration example 2: RNL; length 3 D
  Configuration example 3: RNNNNNL; length 3.5 D
  Configuration example 4: RNNNL; length 5 D The raw materials used in the working examples and comparative examples are as follows.
  Resin Pellet (A)
(A-1) Recycled Polycarbonate Resin Pellet
  2010ANC produced by SHANGHAI AUSELL MATERIAL
  MFR=14 g/10 min (at 300° C., 1.2 kg load)
(A-2) Polycarbonate Resin Pellet
  53000N produced by Mitsubishi Engineering-Plastics Corp.
  Viscosity average molecular weight (Mv): 22,000

(A-3) Polycarbonate Resin/ABS Resin Pellet
  Pellet obtained by compounding 80 mass % of polycarbonate resin flake (S3000F produced by Mitsubishi Engineering-Plastics Corp.; viscosity average molecular weight Mv=22,000) and 20 mass % of ABS resin pellet (SXH-330 produced by Nippon A and L Inc.) in advance.
Phosphorus-Containing Liquid Flame Retardant (B)
  Bisphenol A bis(diphenyl phosphate)
  Adekastab FP-600 produced by ADEKA
Polycarbonate Resin Flake (C)
  53000F produced by Mitsubishi Engineering-Plastics Corp., Mv=22,000
ABS Resin (D)
  ABS resin pellet, SXH-330 produced by Nippon A and L Inc.
Additive (E) Other than Component (B)
  PTFE (FA500H produced by Daikin Industries, Ltd.)

Production Example A1

Recycled polycarbonate resin pellet (A-1) was supplied at a rate of 240 kg/h (60 mass %) and polycarbonate resin flake (C) was supplied at a rate of 80 kg/h (20 mass %) from a feeding port 1 to a co-rotating twin screw extruder (TEX44αII produced by Japan Steel Works, Ltd.), kneaded with a first kneading zone having screw configuration example 3, after which a phosphorus-containing liquid flame retardant (B) was fed at a rate of 80 kg/h (20 mass %) from a liquid supply pump 5, kneaded with a second kneading zone having screw configuration example 2, after which decompression was carried out using a vent, a strand was extruded from a discharge port and cooled in a water bath, and polycarbonate resin composition pellets were obtained using a pelletizer. The screw rotation speed was 700 rpm, and the preset cylinder temperature was 260° C.

A plate having a thickness of 3 mm was formed by injection molding the obtained pellets.

YI was measured with transmitted light using a SE6000 spectrophotometer produced by Nippon Denshoku Industries Co., Ltd. In addition, this 3 mm thick plate was measured in terms of total light transmittance (%) with transmitted light using a haze meter NDH4000 produced by Nippon Denshoku Industries Co., Ltd. in accordance with JIS K7361 using a D65/10° light source.

The results are shown in Table 1.

Production Examples A2 to A6

Production was carried out in the same way as in production example A1, except that the screw configurations of the first kneading zone and the second kneading zone were changed to the configuration examples shown in Table 1 and the screw rotational speed was changed to the discharge rates and rotational speeds shown in Table 1.

Comparative Production Example A1

Compounding was carried out in the same way as in production example A1, except that the screw configuration of the first kneading zone was changed to configuration example 1 and the screw configuration of the second kneading zone was changed to configuration example 3. However, unmelted raw material polycarbonate resin recycled pellet (A-1) was present, the strand broke, drawing became impossible, and resin leaked from a vent. Sampling of product pellets was difficult. It was thought that the screw configuration of the first kneading zone was too short and the raw material pellets did not completely melt.

Comparative Production Examples A2 to A8

Production was carried out in the same way as in production example A1, except that the screw configurations of the first kneading zone and the second kneading zone were changed to the configuration examples shown in Table 1. The results are shown in Table 1. In comparative production examples A4, A5 and A6, a liquid substance was observed at the vent, and resin leaked from a vent. The strand frequently broke and sampling of product pellets was difficult. It was thought that this was because the configuration of the second kneading zone was too short and the phosphorus-containing liquid flame retardant was not dispersed.

Comparative Production Example A9

Compounding was carried out in the same way as in production example A1, except that the phosphorus-containing liquid flame retardant (B), like the other raw materials, was fed from the feeding port at the base of the extruder. However, a significant amount of resin leaked from a vent, unmelted product was present, and strand drawing was impossible. It was thought that this was because the phosphorus-containing liquid flame retardant acted as a lubricant, the polycarbonate resin pellets (A-1) did not melt because no shearing occurred in the first kneading zone and did not completely melt in the second kneading zone, resin leaked from a vent, and compounding was not possible.

Comparative Production Example A10

Under the conditions used in comparative production example A9, the rates of all the raw materials were lowered by a certain amount and the discharge rate was changed to 300 kg/h, but the situation did not improve.

Comparative Production Example A11

The rates of all the raw materials were the same as the conditions used in comparative production example A10, but the supply rates were lowered. As a result, it was necessary to greatly lower the overall feed rate to 140 kg/h in order to enable strand drawing without resin leaking from a vent. Because the feed rate was lowered, it was thought that the residence time increased, sufficient shearing was applied and the polycarbonate resin pellets (A-1) melted. However, total light transmittance was low and YI was high.

These results are shown in Tables 1 to 2.

TABLE 1

| | | Production Example | | | | | |
|---|---|---|---|---|---|---|---|
| | | A1 | A2 | A3 | A4 | A5 | A6 |
| Screw configuration | 1st kneading zone | 3 | 3 | 2 | 2 | 2 | 2 |
| | 2nd kneading unit | 2 | 3 | 2 | 3 | 3 | 3 |
| Component (B) feeding position | | Between first kneading unit and second kneading unit | | | | | |
| Discharge rate | kg/h | 400 | 400 | 400 | 400 | 300 | 500 |
| Screw rotation speed | rpm | 700 | 700 | 700 | 700 | 550 | 800 |
| Resin temperature (° C.) | | 290 | 293 | 286 | 288 | 284 | 290 |
| Vent-up | | No | No | No | No | No | No |
| Strand condition | | No problems | No problems | No problems | No problems | No problems | No problems |
| Total light transmittance (%) | | 83 | 82 | 85 | 84 | 84 | 85 |
| YI (transmitted light) | | 1.7 | 1.7 | 1.5 | 1.6 | 1.5 | 1.5 |

TABLE 2

| | | Comparative Production Example | | | | | | | | | | |
|---|---|---|---|---|---|---|---|---|---|---|---|---|
| | | A1 | A2 | A3 | A4 | A5 | A6 | A7 | A8 | A9 | A10 | A11 |
| Screw configuration | 1st kneading zone | 1 | 1 | 1 | 3 | 3 | 4 | 4 | 4 | 3 | 3 | 3 |
| | 2nd kneading unit | 3 | 3 | 4 | 1 | 1 | 1 | 2 | 3 | 2 | 2 | 2 |
| Component (B) feeding position | | Between first kneading unit and second kneading unit | | | | | | | | Upstream from first kneading unit | | |
| Discharge rate | kg/h | 400 | 300 | 400 | 400 | 300 | 400 | 400 | 400 | 400 | 300 | 140 |
| Screw rotation speed | rpm | 700 | 700 | 700 | 700 | 700 | 700 | 700 | 700 | 700 | 700 | 700 |
| Resin temperature (° C.) | | — | — | — | — | — | — | 305 | 308 | — | — | 303 |
| Vent-up | | Yes | Yes | Yes | Yes | Yes | Yes | No | No | Yes | Yes | No |
| Strand condition | | Unmelted product present. Strand drawing not possible. | Unmelted product present. Strand drawing not possible. | Unmelted product present. Strand drawing not possible. | liquid substance present. Strand drawing not possible. | liquid substance present. Strand drawing not possible. | liquid substance present. Strand drawing not possible. | No problems | No problems | Unmelted product present. Strand drawing not possible. | same as left | No problems |
| Total light transmittance (%) | | — | — | — | — | — | — | 79 | 78 | — | — | 77 |
| YI (transmitted light) | | — | — | — | — | — | — | 2.3 | 2.5 | — | — | 3.2 |

Production Examples B1 to B6 and Comparative Production Examples B1 to B8

Compounding was carried out in the same way as in production example A1, except that the polycarbonate resin recycled pellet (A-1) was supplied at a rate of 200 kg/h (50 mass %), the polycarbonate flake (C) was supplied at a rate of 140 kg/h (35 mass %), the phosphorus-containing liquid flame retardant (B) was supplied at a rate of 60 kg/h (15 mass %) and the screw rotational speed was changed to a value shown in the table. The results are shown in Table 3.

TABLE 3

| | | Production Example | | | | | | Comparative Production Example | | | | | | | |
|---|---|---|---|---|---|---|---|---|---|---|---|---|---|---|---|
| | | B1 | B2 | B3 | B4 | B5 | B6 | B1 | B2 | B3 | B4 | B5 | B6 | B7 | B8 |
| Screw configuration | 1st kneading zone | 3 | 3 | 2 | 2 | 2 | 2 | 1 | 1 | 1 | 3 | 3 | 4 | 4 | 4 |
| | 2nd kneading unit | 2 | 3 | 2 | 3 | 3 | 3 | 3 | 3 | 4 | 1 | 1 | 1 | 2 | 3 |
| Component (B) feeding position | | Between first kneading unit and second kneading unit | | | | | | Between first kneading unit and second kneading unit | | | | | | | |
| Discharge rate | kg/h | 400 | 400 | 400 | 400 | 300 | 500 | 400 | 300 | 400 | 400 | 300 | 400 | 400 | 400 |
| Screw rotation speed | rpm | 700 | 700 | 700 | 700 | 550 | 800 | 700 | 700 | 700 | 700 | 700 | 700 | 700 | 700 |
| Resin temperature (° C.) | | 294 | 297 | 291 | 293 | 289 | 294 | — | — | — | — | — | — | 310 | 311 |
| Vent-up | | No | No | No | No | No | No | Yes | Yes | Yes | Yes | Yes | Yes | No | No |
| Strand condition | | No problems | No problems | No problems | No problems | No problems | No problems | Unmelted product present. Strand drawing not possible. | same as left | same as left | liquid substance present. Strand drawing not possible. | liquid substance present. Strand drawing not possible. | liquid substance present. Strand drawing not possible. | No problems | No problems |
| Total light transmittance (%) | | 81 | 80 | 83 | 83 | 82 | 83 | — | — | — | — | — | — | 75 | 75 |
| YI (transmitted light) | | 1.9 | 1.8 | 1.7 | 1.7 | 1.6 | 1.8 | — | — | — | — | — | — | 2.8 | 3 |

Production Examples C1 to C6 and Comparative Production Examples C1 to C8

Compounding was carried out in the same way as in production example A1, except that the polycarbonate resin recycled pellet (A-1) was supplied at a rate of 320 kg/h (80 mass %), the polycarbonate flake (C) was supplied at a rate of 0 kg/h (0 mass %), the phosphorus-containing liquid flame retardant (B) was supplied at a rate of 80 kg/h (20 mass %) and the screw rotational speed was changed to a value shown in the table.

The results are shown in Table 4.

TABLE 4

| | | Production Example | | | | | | Comparative Production Example | | | | | | | |
|---|---|---|---|---|---|---|---|---|---|---|---|---|---|---|---|
| | | C1 | C2 | C3 | C4 | C5 | C6 | C1 | C2 | C3 | C4 | C5 | C6 | C7 | C8 |
| Screw configuration | 1st kneading zone | 3 | 3 | 2 | 2 | 2 | 2 | 1 | 1 | 1 | 3 | 3 | 4 | 4 | 4 |
| | 2nd kneading unit | 2 | 3 | 2 | 3 | 3 | 3 | 3 | 3 | 4 | 1 | 1 | 1 | 2 | 3 |
| Component (B) feeding position | | Between first kneading unit and second kneading unit | | | | | | Between first kneading unit and second kneading unit | | | | | | | |
| Discharge rate | kg/h | 400 | 400 | 400 | 400 | 300 | 500 | 400 | 300 | 400 | 400 | 300 | 400 | 400 | 400 |
| Screw rotation speed | rpm | 700 | 700 | 700 | 700 | 550 | 800 | 700 | 700 | 700 | 700 | 700 | 700 | 700 | 700 |
| Resin temperature (° C.) | | 288 | 290 | 285 | 286 | 282 | 287 | — | — | — | — | — | — | 303 | 305 |

TABLE 4-continued

|  | Production Example | | | | | | Comparative Production Example | | | | | | | |
| --- | --- | --- | --- | --- | --- | --- | --- | --- | --- | --- | --- | --- | --- | --- |
|  | C1 | C2 | C3 | C4 | C5 | C6 | C1 | C2 | C3 | C4 | C5 | C6 | C7 | C8 |
| Vent-up | No | No | No | No | No | No | Yes | Yes | Yes | Yes | Yes | Yes | No | No |
| Strand condition | No problems | No problems | No problems | No problems | No problems | No problems | Unmelted product present. Strand drawing not possible. | same as left | same as left | liquid substance present. Strand drawing not possible. | liquid substance present. Strand drawing not possible. | liquid substance present. Strand drawing not possible. | No problems | No problems |
| Total light transmittance (%) | 83 | 83 | 85 | 84 | 85 | 84 | — | — | — | — | — | — | 78 | 78 |
| YI (transmitted light) | 1.7 | 1.7 | 1.4 | 1.6 | 1.5 | 1.6 | — | — | — | — | — | — | 2.3 | 2.4 |

Production Examples D1 to D6 and Comparative Production Examples D1 to D8

Compounding was carried out in the same way as in production example A1, except that the polycarbonate resin recycled pellet (A-1) was supplied at a rate of 200 kg/h (50 mass %), the polycarbonate flake (C) was supplied at a rate of 40 kg/h (10 mass %), the ABS resin pellet (D) was supplied at a rate of 80 kg/h (20 mass %), the phosphorus-containing liquid flame retardant (B) was supplied at a rate of 80 kg/h (20 mass %) and the screw rotational speed was changed to a value shown in the table. Color tone YI was measured with reflected light.

The results are shown in Table 5.

TABLE 5

|  |  | Production Example | | | | | | Comparative Production Example | | | | | | | |
| --- | --- | --- | --- | --- | --- | --- | --- | --- | --- | --- | --- | --- | --- | --- | --- |
|  |  | D1 | D2 | D3 | D4 | D5 | D6 | D1 | D2 | D3 | D4 | D5 | D6 | D7 | D8 |
| Screw configuration | 1st kneading zone | 3 | 3 | 2 | 2 | 2 | 2 | 1 | 1 | 1 | 3 | 3 | 4 | 4 | 4 |
|  | 2nd kneading unit | 2 | 3 | 2 | 3 | 3 | 3 | 3 | 3 | 4 | 1 | 1 | 1 | 2 | 3 |
| Component (B) feeding position |  | Between first kneading unit and second kneading unit | | | | | | Between first kneading unit and second kneading unit | | | | | | | |
| Discharge rate | kg/h | 400 | 400 | 400 | 400 | 300 | 500 | 400 | 300 | 400 | 400 | 300 | 400 | 400 | 400 |
| Screw rotation speed | rpm | 700 | 700 | 700 | 700 | 550 | 800 | 700 | 700 | 700 | 700 | 700 | 700 | 700 | 700 |
| Resin temperature (° C.) |  | 285 | 288 | 284 | 285 | 280 | 286 | — | — | — | — | — | — | 302 | 303 |
| Vent-up |  | No | No | No | No | No | No | Yes | Yes | Yes | Yes | Yes | Yes | No | No |
| Strand condition |  | No problems | No problems | No problems | No problems | No problems | No problems | Unmelted product present. Strand drawing not possible. | same as left | same as left | liquid substance present. Strand drawing not possible. | liquid substance present. Strand drawing not possible. | liquid substance present. Strand drawing not possible. | No problems | No problems |
| YI (reflected light) |  | 2.7 | 2.7 | 2.6 | 2.7 | 2.6 | 2.6 | — | — | — | — | — | — | 3.6 | 3.8 |

Production Examples E1 to E6 and Comparative Production Examples E1 to E8

Compounding was carried out in the same way as in production example A1, except that the polycarbonate resin recycled pellet (A-1) was supplied at a rate of 200 kg/h (50 mass %), the polycarbonate flake (C) was supplied at a rate of 40 kg/h (10 mass %), the ABS resin pellet (D) was supplied at a rate of 78 kg/h (19.5 mass %), PTFE was supplied as the other additive (E) at a rate of 2 kg/h (0.5 mass %), the phosphorus-containing liquid flame retardant (B) was supplied at a rate of 80 kg/h (20 mass %) and the screw rotational speed was changed to a value shown in the table. Color tone YI was measured with reflected light.

The results are shown in Table 6.

TABLE 6

|  |  | Production Example |  |  |  |  |  | Comparative Production Example |  |  |  |  |  |  |  |
|---|---|---|---|---|---|---|---|---|---|---|---|---|---|---|---|
|  |  | E1 | E2 | E3 | E4 | E5 | E6 | E1 | E2 | E3 | E4 | E5 | E6 | E7 | E8 |
| Screw configuration | 1st kneading zone | 3 | 3 | 2 | 2 | 2 | 2 | 1 | 1 | 1 | 3 | 3 | 4 | 4 | 4 |
|  | 2nd kneading unit | 2 | 3 | 2 | 3 | 3 | 3 | 3 | 3 | 4 | 1 | 1 | 1 | 2 | 3 |
| Component (B) feeding position |  | Between first kneading unit and second kneading unit | | | | | | | | | Between first kneading unit and second kneading unit | | | | |
| Discharge rate | kg/h | 400 | 400 | 400 | 400 | 300 | 500 | 400 | 300 | 400 | 400 | 300 | 400 | 400 | 400 |
| Screw rotation speed | rpm | 700 | 700 | 700 | 700 | 550 | 800 | 700 | 700 | 700 | 700 | 700 | 700 | 700 | 700 |
| Resin temperature (° C.) |  | 287 | 290 | 287 | 288 | 283 | 289 | — | — | — | — | — | — | 306 | 307 |
| Vent-up |  | No | No | No | No | No | No | Yes | Yes | Yes | Yes | Yes | Yes | No | No |
| Strand condition |  | No problems | No problems | No problems | No problems | No problems | No problems | Unmelted product present. Strand drawing not possible. | same as left | same as left | liquid substance present. Strand drawing not possible. | liquid substance present. Strand drawing not possible. | liquid substance present. Strand drawing not possible. | No problems | No problems |
| YI (reflected light) |  | 2.8 | 2.8 | 2.7 | 2.8 | 2.7 | 2.7 | — | — | — | — | — | — | 3.7 | 3.9 |

Production Examples F1 to F6 and Comparative Production Examples F1 to F8

Compounding was carried out in the same way as in production example A1, except that "S3000N" polycarbonate resin pellet (A-2) was supplied at a rate of 320 kg/h (80 mass %), the liquid flame retardant (B) was supplied at a rate of 80 kg/h (20 mass %) and the screw rotational speed was changed to a value shown in the table. Color tone YI was measured with transmitted light.

The results are shown in Table 7.

TABLE 7

|  |  | Production Example |  |  |  |  |  | Comparative Production Example |  |  |  |  |  |  |  |
|---|---|---|---|---|---|---|---|---|---|---|---|---|---|---|---|
|  |  | F1 | F2 | F3 | F4 | F5 | F6 | F1 | F2 | F3 | F4 | F5 | F6 | F7 | F8 |
| Screw configuration | 1st kneading zone | 3 | 3 | 2 | 2 | 2 | 2 | 1 | 1 | 1 | 3 | 3 | 4 | 4 | 4 |
|  | 2nd kneading unit | 2 | 3 | 2 | 3 | 3 | 3 | 3 | 3 | 4 | 1 | 1 | 1 | 2 | 3 |

TABLE 7-continued

| | | Production Example | | | | | | Comparative Production Example | | | | | | | |
|---|---|---|---|---|---|---|---|---|---|---|---|---|---|---|---|
| | | F1 | F2 | F3 | F4 | F5 | F6 | F1 | F2 | F3 | F4 | F5 | F6 | F7 | F8 |
| Component (B) feeding position | | Between first kneading unit and second kneading unit | | | | | | Between first kneading unit and second kneading unit | | | | | | | |
| Discharge rate | kg/h | 400 | 400 | 400 | 400 | 300 | 500 | 400 | 300 | 400 | 400 | 300 | 400 | 400 | 400 |
| Screw rotation speed | rpm | 700 | 700 | 700 | 700 | 550 | 800 | 700 | 700 | 700 | 700 | 700 | 700 | 700 | 700 |
| Resin temperature (° C.) | | 288 | 290 | 285 | 286 | 282 | 287 | — | — | — | — | — | — | 303 | 305 |
| Vent-up | | No | No | No | No | No | No | Yes | Yes | Yes | Yes | Yes | Yes | No | No |
| Strand condition | | No problems | No problems | No problems | No problems | No problems | No problems | Unmelted product present. Strand drawing not possible. | same as left | same as left | liquid substance present. Strand drawing not possible. | liquid substance present. Strand drawing not possible. | liquid substance present. Strand drawing not possible. | No problems | No problems |
| Total light transmittance | | 86 | 86 | 88 | 86 | 88 | 86 | — | — | — | — | — | — | 80 | 79 |
| YI (transmitted light) | | 1.4 | 1.4 | 1.2 | 1.3 | 1.3 | 1.2 | — | — | — | — | — | — | 2.1 | 2.2 |

Production Examples G1 to G6 and Comparative Production Examples G1 to G8

Compounding was carried out in the same way as in production example A1, except that polycarbonate resin/ABS resin pellet (A-3) was supplied at a rate of 240 kg/h (60 mass %), the polycarbonate flake (C) was supplied at a rate of 40 kg/h (10 mass %), the ABS resin pellet (D) was supplied at a rate of 40 kg/h (10 mass %), the phosphorus-containing liquid flame retardant (B) was supplied at a rate of 80 kg/h (20 mass %) and the screw rotational speed was changed to a value shown in the table. Color tone YI was measured with reflected light.

The results are shown in Table 8.

TABLE 8

| | | Production Example | | | | | | Comparative Production Example | | | | | | | |
|---|---|---|---|---|---|---|---|---|---|---|---|---|---|---|---|
| | | G1 | G2 | G3 | G4 | G5 | G6 | G1 | G2 | G3 | G4 | G5 | G6 | G7 | G8 |
| Screw configuration | 1st kneading zone | 3 | 3 | 2 | 2 | 2 | 2 | 1 | 1 | 1 | 3 | 3 | 4 | 4 | 4 |
| | 2nd kneading unit | 2 | 3 | 2 | 3 | 3 | 3 | 3 | 3 | 4 | 1 | 1 | 1 | 2 | 3 |
| Component (B) feeding position | | Between first kneading unit and second kneading unit | | | | | | Between first kneading unit and second kneading unit | | | | | | | |
| Discharge rate | kg/h | 400 | 400 | 400 | 400 | 300 | 500 | 400 | 300 | 400 | 400 | 300 | 400 | 400 | 400 |
| Screw rotation speed | rpm | 700 | 700 | 700 | 700 | 550 | 800 | 700 | 700 | 700 | 700 | 700 | 700 | 700 | 700 |
| Resin temperature (° C.) | | 285 | 288 | 284 | 285 | 280 | 286 | — | — | — | — | — | — | 302 | 303 |
| Vent-up | | No | No | No | No | No | No | Yes | Yes | Yes | Yes | Yes | Yes | No | No |
| Strand condition | | No problems | No problems | No problems | No problems | No problems | No problems | Unmelted product present. Strand drawing not possible. | same as left | same as left | liquid substance present. Strand drawing not possible. | liquid substance present. Strand drawing not possible. | liquid substance present. Strand drawing not possible. | No problems | No problems |
| YI (reflected light) | | 2.8 | 2.9 | 2.5 | 2.7 | 2.5 | 2.8 | — | — | — | — | — | — | 3.8 | 3.8 |

INDUSTRIAL APPLICABILITY

According to the method of the present invention, it is possible to produce a polycarbonate resin composition pellet in which unmelted product does not occur, resin does not leak from a vent, good productivity can be stably achieved, and it is possible to produce a polycarbonate resin composition pellet that exhibits excellent uniform flame retardancy and color hue, and the obtained polycarbonate resin pellet can be widely used in materials for producing components of office automation equipment such as printers and copiers, electrical equipment, electronic devices, vehicles such as automobiles, houses, buildings and other industrial fields, and the present invention therefore exhibits extremely high industrial applicability.

The invention claimed is:

1. A method for producing a polycarbonate resin composition pellet with a twin screw extruder, wherein the polycarbonate resin composition pellet comprises:
    30 to 95 mass % of a resin pellet (A);
    5 mass % or more, and less than 40 mass % of a phosphate ester flame retardant (B) that is a liquid at room temperature;
    0 to 50 mass % of polycarbonate resin flake (C);
    0 to 30 mass % of an ABS resin (D); and
    0 to 15 mass % of an additive (E) other than component (B), based on a total amount of (A), (B), (C), (D) and (E) being 100 mass %, where the resin pellet (A) includes more than 40 mass % of a polycarbonate resin based on an amount of the resin pellet (A), and,
    the method comprises:
    feeding (A), (C), (D) and (E) in a twin screw extruder and kneading (A), (C), (D) and (E) in a first kneading zone to form a first kneaded mixture;
    then feeding (B) outside and downstream of the first kneading zone and kneading (B) and the first kneaded mixture in a second kneading zone to form a second kneaded mixture; and
    decompressing a vent that is downstream of the second kneading zone to devolatilize and extrude the second kneaded mixture, wherein:
    the first kneading zone has a configuration in which a length thereof is 2.5 D to 6.0 D, wherein D is a screw diameter, and consists of at least one selected from the group consisting of an R kneading disc having an angle of twist of 10° to 75°, an N kneading disc having an angle of twist of 75° to 105°, an L kneading disc having an angle of twist of −10° to −75°, an L screw, a sealing ring, a mixing screw and a rotor screw, and includes a combination of the R kneading disc, the N kneading disc and the L kneading disc; and
    the second kneading zone has a configuration in which the length thereof is 1.3 D to 4.0 D and consists of at least one selected from the group consisting of an R kneading disc having an angle of twist of 10° to 75°, an N kneading disc having an angle of twist of 75° to 105°, an L kneading disc having an angle of twist of −10° to −75°, an L screw, a sealing ring, a mixing screw and a rotor screw, and includes a combination of the R kneading disc, the N kneading disc and the L kneading disc.

2. The method of claim 1, wherein the polycarbonate resin is more than 50 mass % based on the amount of the resin pellet (A).

3. The method according to claim 1, wherein the resin pellet (A) is 30 to 80 mass % based on the total amount of (A), (B), (C), (D) and (E) being 100 mass %.

4. The method of claim 1, wherein the phosphate ester flame retardant (B) is 5 mass % or more, and less than 25 mass % based on the total amount of (A), (B), (C), (D) and (E) being 100 mass %.

5. The method of claim 1, wherein the resin pellet (A) includes a recycled resin pellet.

6. The method of claim 1, wherein the polycarbonate resin composition pellet includes 50 to 100 mass % of the polycarbonate resin and 0 to 50 mass % of the ABS resin and/or a polyester resin based on a total amount of the polycarbonate resin, the ABS resin and/or the polyester resin being 100 mass %.

7. The method of claim 1, wherein a length of the first kneading zone is 3.5 to 5.5 D, and a length of the second kneading zone is 2.0 to 4.0 D.

* * * * *